United States Patent [19]
Bingel et al.

[11] Patent Number: 6,028,919
[45] Date of Patent: Feb. 22, 2000

[54] PASSIVE DISTRIBUTED FILTER SYSTEM AND METHOD INCLUDING CALLER ID

[75] Inventors: Thomas J. Bingel, Belleair Beach; Carlos A. Rios, Safety Harbor, both of Fla.

[73] Assignee: Paradyne Corporation, Largo, Fla.

[21] Appl. No.: 09/019,844

[22] Filed: Feb. 6, 1998

Related U.S. Application Data

[60] Provisional application No. 60/067,778, Dec. 10, 1997.

[51] Int. Cl.[7] .............................. H04M 1/56; H04M 15/06
[52] U.S. Cl. ....................... 379/142; 379/93.05; 375/350
[58] Field of Search .................................. 379/142, 90.01, 379/93.05, 93.11, 93.14, 93.15; 375/350, 285; 327/551

[56] References Cited

U.S. PATENT DOCUMENTS

| | | | |
|---|---|---|---|
| 5,623,543 | 4/1997 | Cook | 379/402 |
| 5,724,412 | 3/1998 | Srinivasan | 379/93.23 |
| 5,841,841 | 11/1998 | Dodds et al. | 379/93.08 |
| 5,896,443 | 4/1999 | Dichter | 379/93.08 |

*Primary Examiner*—Paul Loomis
*Assistant Examiner*—Quoc Tran
*Attorney, Agent, or Firm*—Thomas, Kayden, Horstemeyer & Risley

[57] ABSTRACT

A plurality of distributed POTS filters (DPF) are associated with a respective plurality of POTS communications devices and decouple a POTS channel from a telephone connection, while permitting and not interfering with a second communications channel (e.g., DSL, ADSL, SDSL, RADSL, VADSL, etc.) on the telephone connection that is utilized by a modem, and permit the passage of additional signals, such as caller ID signals, to the plurality POTS communications devices. In architecture, the DPF system includes a plurality of POTS communications devices, such as telephones, and a plurality of the DPFs corresponding respectively with and connecting each of the POTS communications devices to the telephone connection. Each of the DPFs comprise an automatic control mechanism, which includes circuitry configured to allow the passage of additional signals, such as caller ID signals, to the plurality of POTS communications devices and a POTS filter. The automatic control mechanism is configured to isolate the POTS filter when a respective POTS communications device is on-hook. Each DPF is configured to permit POTS communications over a POTS channel on the telephone connection with the respective POTS communications device when the POTS communications device is off-hook. Furthermore, a second communications device, such as a DSL (e.g., ADSL, SDSL, RADSL, VADSL, etc.) communications device, is connected to the telephone connection and communicates signals over a second channel. The POTS and second channel are communicated over the telephone connection concurrently without appreciable interference.

31 Claims, 6 Drawing Sheets

6,028,919

PASSIVE DISTRIBUTED FILTER SYSTEM AND METHOD INCLUDING CALLER ID

CROSS REFERENCE TO RELATED APPLICATION

Pursuant to 35 U.S.C. Section 119, this document claims priority to and the benefit of the filing date of co-pending and commonly assigned provisional application entitled DISTRIBUTED POTS FILTER WITH CALLER ID, assigned serial No. 60-067778, and filed Dec. 10, 1997, and is hereby incorporated by reference.

FIELD OF THE INVENTION

The present invention generally relates to the art of data communications and telephony, and, more particularly, to a passive distributed filter system and method for enabling reliable and efficient decoupling of two simultaneous communications channels on a telephone connection at a plurality of sites, while permitting the passage to a communications device, or telephone, of additional signal information, such as CLASS calling information delivery service per Bellcore document GR-30-CORE, commonly referred to as caller ID. Caller ID is a signal, which includes information regarding the identity of the incoming call, that is passed from the telephone central office, through the subscriber telephone line to a caller ID unit or telephone equipped to receive the caller ID signal when all telephones are "on hook". The passive distributed filter system and method are particularly suited for decoupling a plain old telephone system (POTS) channel on a telephone connection for a plurality of POTS communications devices, while permitting and not interfering with another communications channel (e.g., digital subscriber line (DSL), asymmetric DSL (ADSL), symmetric ADSL (SDSL), rate adaptive digital subscriber line (RADSL), very high speed ADSL (VADSL), etc.) that is communicated simultaneously with the POTS channel on the telephone connection. In this context, the invention is referred to as a distributed POTS filter (DPF).

BACKGROUND OF THE INVENTION

Recently, in the art of telephony, 2-wire copper telephone connections have been utilized for communicating two simultaneous channels, such as both digital data and analog voice signals. For example, a high speed digital subscriber line (DSL) channel (e.g., ADSL, SDSL, RADSL, VADSL, etc.) and a plain old telephone system (POTS) channel can be established over a single physical 2-wire connection. The signals are typically separated in frequency. The POTS channel usually exhibits a frequency spectrum of about 0 KHz to about 4 KHz, whereas the ADSL channel exhibits a frequency spectrum of about 20 KHz to about 500 KHz.

A POTS splitter is utilized to decouple the channels. A POTS splitter is typically a passive or active one-to-two port device. It often includes a low pass filter to minimize high frequency transients produced by on-hook/off-hook transitions so as to prevent tainting or slowing of the high speed data on the DSL channel. Also, it is usually configured to provide a high impedance to the telephone line in the ADSL frequency band in order to prevent ADSL power from being imparted on the POTS communications device that is connected to the line. Because of the foregoing requisite functionality, POTS splitters are usually expensive devices and are oftentimes installed on a physical wall of a premises, such as on an outside wall of a building. Furthermore, generally, POTS splitters require installation by a skilled telephone company worker, not the premises owner, resulting in undesirable installation time, labor, and expense.

The specification of POTS splitters has been the subject of several industry standards bodies. For example, see American National Standards Institute, ANSI T1.413-1995, Sections 8 and 10, regarding ADSL/POTS splitters. Moreover, as an example of a possible implementation of a POTS splitter, see J. Cook, P. Sheppard, "ADSL and VADSL Splitter Design and Telephony Performance," *IEEE Journal on Selected Areas in Communications*, December 1995.

A heretofore unaddressed need exist in the industry for an improved system and method for more efficiently and inexpensively implementing POTS splitters, (e.g., a distributed POTS filter) that permit the passage to the telephone of telephone company special signals, such as caller ID.

SUMMARY OF THE INVENTION

Briefly described, the present invention provides for a passive distributed filter system and method for enabling decoupling of first and second simultaneous communications channels on a telephone connection. The passive distributed filter system and method are particularly suited for decoupling a plain old telephone system (POTS) channel on a telephone connection for a plurality of POTS communications devices located at a plurality of different sites, while permitting and not appreciably interfering with another communications channel (e.g., DSL, ADSL, SDSL, RADSL, VADSL, etc.) that is communicated simultaneously with the POTS channel on the telephone connection, and that allows the passage of telephone company special signals, such as caller ID signals, when the POTS communications devices are on-hook. In this context, the invention is referred to as a distributed POTS filter (DPF) system.

In architecture, the passive distributed filter system is constructed as follows. A plurality of first communications devices (e.g., telephones or other POTS devices) at various sites in a premises, as an example, are connected to a telephone connection by way of a respective plurality of passive distributed filters. Each distributed filter comprises an automatic control mechanism and a passive first channel filter (e.g., a POTS filter), whereby the automatic control mechanism further includes circuitry configured to allow the passage of special signals, such as caller ID signals, when all telephones are on-hook. This circuitry is configured to bypass the circuitry that prevents the passage of special signals, such as caller ID. The first channel filter is a one-to-one port device, unlike conventional POTS splitters, which are generally one-to-two port devices. The automatic control mechanism is configured to isolate the first channel filter when a respective first communications device is inactive (on-hook). Further, the distributed filter is configured to interface communications on a first channel (e.g., POTS) on the telephone connection with the respective first communications device when the first communications device is active (off-hook). Moreover, a second communications device (e.g., an DSL, ADSL, SDSL, RADSL, or VADSL modem) is connected to the telephone connection and communicates signals over a second channel (e.g., DSL, ADSL, SDSL, RADSL, VADSL, etc.), simultaneously with the first channel. As a result of the invention, an inexpensive passive distributed filter associated with each POTS device prevents on-hook/off-hook transitions from interfering with the second channel communications, while allowing a signal, such as a caller ID signal, to reach each telephone.

The invention can also be conceptualized as providing a method for implementing a passive distributed filter system for enabling decoupling of first and second communications channels on a telephone connection at a plurality of sites, while enabling the passage of caller ID signals to each telephone. In this regard, the method can be broadly summarized as follows: (a) interfacing a plurality of first channel communications devices with the telephone connection using distributed filters, the first channel communications devices configured to communicate over the telephone connection via a first channel, the distributed filters comprising an automatic control mechanism and a first channel filter, the automatic control mechanism configured to isolate the first channel filter when a respective first communications device is inactive, the distributed filter configured to interface communications on a first channel on the telephone connection with the respective first communications device when the first communications device is active; (b) interfacing a second channel communications device to the telephone connection, the second channel communications device configured to communicate over the telephone connection via a second channel; (c) permitting noninterfering simultaneous communications via the first and second channels over the telephone connection; and (d) permitting the passage of an additional signal during the times when each of the first channel communications devices is on-hook.

The invention has numerous advantages, a few of which are delineated hereafter, as merely examples.

An advantage of the invention is that it can be used in any data communication environment where a single physical connection (2-wire) has at least two communications channels (e.g., a high speed DSL, ADSL, SDSL, RADSL, or VADSL link in combination with a POTS link), where the channels are separated by frequency.

Another advantage of the invention is that it can be used to affect economical deployment of a DSL, ADSL, SDSL, RADSL, or VADSL communications channel simultaneously in combination with a POTS communications channel on a telephone connection.

Another advantage of the invention is that its automatic control mechanism acts as an automatic switch, to connect a POTS filter when a telephone is off-hook and to disconnect the POTS filter when the telephone is on-hook, without adversely affecting communications on the other simultaneous communications channel and while permitting the passage of additional signals, such as caller ID signals, to a telephone. The on-hook/off-hook transition is totally transparent to the user, and all telephone functions work as usual (ringer, pulse, and tone dialing, voice communication, etc.).

Another advantage of the invention is that it is simple in design, efficient in operation, and easily and economically manufactured on a mass scale.

Another advantage of the invention is that it can be employed within a conventional telephone, thereby producing an integrated system. In this regard, telephone manufacturers can produce and sell telephones that are capable of operating in a two channel system. For example, a telephone manufacturer may sell a telephone that is "ADSL ready" in that it can be utilized with a connection having both a POTS channel and an ADSL channel.

Another advantage of the invention is that it provides for an improved POTS filter with better sidetone, lower insertion loss, and lower incremental insertion loss than conventional POTS filters.

Another advantage of the invention is that it utilizes very low cost passive components.

Another advantage of the invention is that it is suitable for homeowners in that it does not require sophisticated installation.

Another advantage of the invention it that it meets surge and safety requirements of industry standard UL1950, Third Edition, and applicable requirements of FCC, Part 68.

Other objects, features, and advantages of the present invention will become apparent to one with skill in the art upon examination of the following drawings and detailed description. It is intended that all such additional objects, features, and advantages be included herein within the scope of the present invention, as is defined in the appended claims.

BRIEF DESCRIPTION OF THE DRAWINGS

The invention can be better understood with reference to the following drawings. The drawings are not necessarily to scale, emphasis instead being placed upon clearly illustrating principles of the present invention. Furthermore, in the drawings, like reference numerals designate corresponding part throughout the several views.

DETAILED DESCRIPTION OF THE PREFERRED EMBODIMENT

Figure 1:
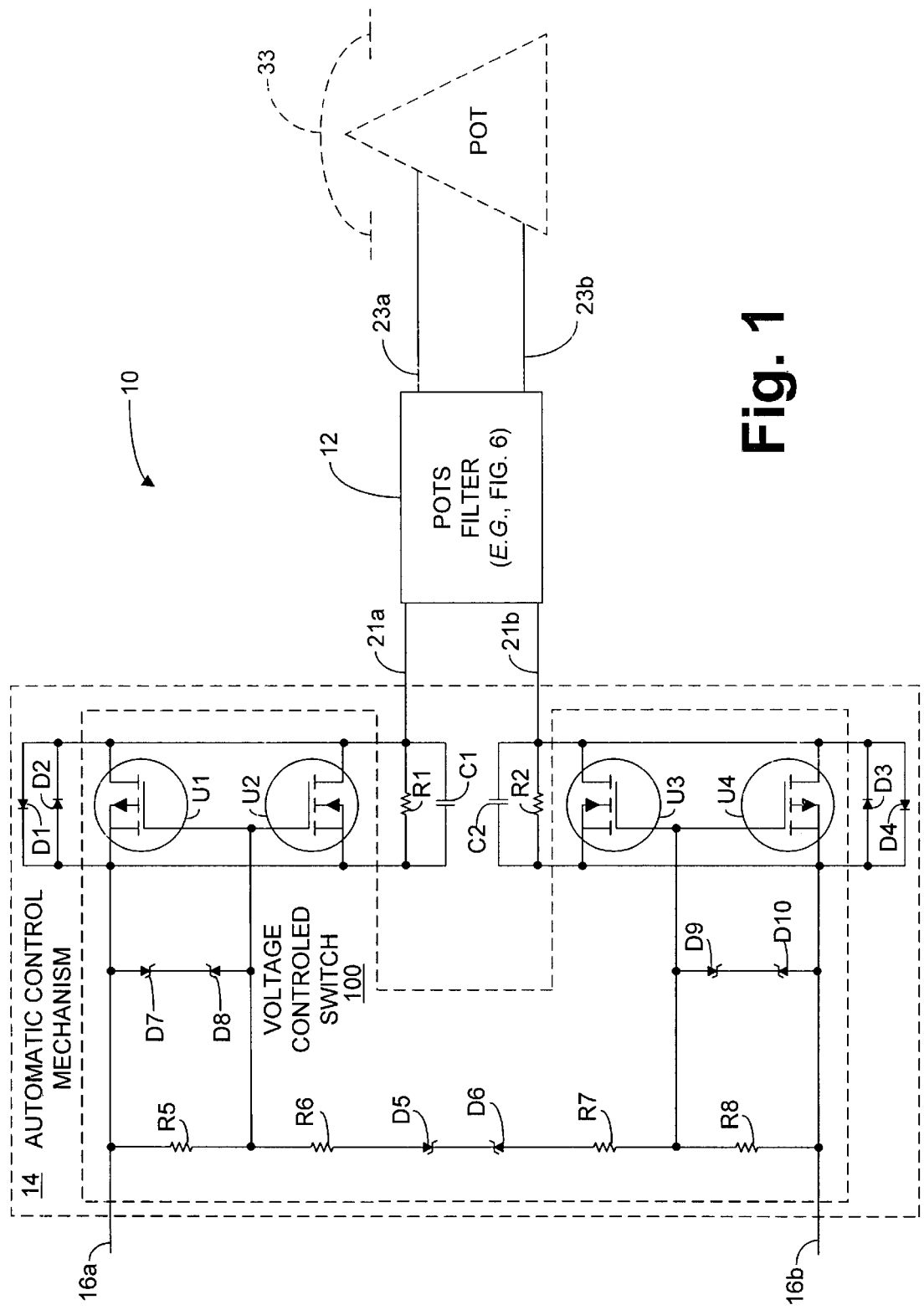
FIG. 1 is a circuit diagram of a distributed POTS filter (DPF) including the circuitry that allows the passage of additional signals in accordance with the present invention.

A distributed filter, and particularly, a distributed POTS filter (DPF), in accordance with the present invention is illustrated in FIG. 1 and is generally denoted by reference numeral 10. It can be utilized to decouple two communication channels on a single 2-wire telephone connection that are separated by frequency. In the preferred embodiment, the DPF 10 is utilized in connection with a POTS channel and another high speed channel, such as a digital subscriber line (DSL) channel (e.g., ADSL, SDSL, RADSL, VADSL, etc.).

The architecture of the DPF 10 will be described first and then the operation thereafter. In architecture, as illustrated in FIG. 1, the DPF 10 generally includes a POTS filter 12 connected in series with an automatic control mechanism 14.

The automatic control mechanism 14 is designed to be connected directly to the customer premises wiring 16, particularly, tip and ring connections 16a, 16b, which are in turn connected to respective tip and ring lines of a conventional telephone connection 23. The automatic control mechanism 14 is configured to automatically either isolate or interface the POTS filter 12 (in the telephony voice spectrum) based upon the off-hook/on-hook status, respectively, of POTS communications devices 33 relative to the customer premises wiring 16. In addition, automatic control mechanism 14 includes voltage controlled switch 100 designed to permit the passage of additional signals, such as for example, a caller ID signal, from the telephone company, through the tip/ring pair, to the telephone 33 when all telephones are on-hook. Voltage controlled switch 100 operates to allow the passage of additional signals, by bypassing the circuitry (i.e., D1–D4) that prevents the passage of special signals such as caller ID, without affecting the operation of the balance of automatic control mechanism 14 (i.e., the ability to isolate or interface POTS filter 12). In the context of this document, POTS communications devices include devices that operate on the Public Switched Telephone Network (PSTN), for example but not limited to, telephones, speaker-phones, analog modems, facsimile machines, cordless phones, etc.

Structurally, the preferred embodiment of the automatic control mechanism 14 is implemented as a balanced network in that the circuitry connected to the tip and ring lines is equivalent. In the balanced configuration, each side comprises two diodes, one capacitor, and one resistor. More specifically, referring to FIG. 1, tip line circuitry includes the following parallel components: diode D1, diode D2, capacitor C1, and resistor R1. Ring line circuitry includes the following circuit components: diode D3, diode D4, capacitor C2, and resistor R2 having values that correspond with D1, D2, C1, and R1, respectively. In the preferred embodiment, D1–D4 are model D1N4001 diodes, C1 and C2 are 10 nF, and R1 and R2 are 10KΩ. Voltage controlled switch 100 also includes parallel circuitry in order to permit passage of additional signals, such as caller ID signals, regardless of the polarity of the tip/ring pair 16a and 16b. Specifically, voltage controlled switch includes tip line circuitry components R5, R6, D5, D7, D8, U1 and U2. Ring line circuitry includes R7, R8, D6, D9, D10, U3 and U4. In the preferred embodiment, R5–R8 are 2MΩ, D5–D10 are model 1N5245 diodes, U1 and U4 are model TP0610 P-channel field effect transistors, and U2 and U3 are model TN0110 N-channel field effect transistors.

The functionality of the aforementioned circuit elements is as follows. When a telephone or other POTS communications device 33 is on-hook, the direct current (DC) resistance of the POTS communications device 33 is greater than 5 MΩ. In this event, very little current is drawn from the customer premises wiring 16, and the diodes D1–D4 of FIG. 1 are essentially unbiased. Unbiased diodes present a high alternating current (AC) impedance in series with the POTS filter 12, thereby disconnecting (or isolating) the POTS filter 12 (and associated loading) from the customer premises wiring 16. This reduction in loading significantly reduces transmission loss and reduces sidetone degradation. In addition, the resistors R1, R2 shunt the leakage current around the diodes D1–D4 in the on-hook state, yet are a high enough impedance to maintain the POTS filter 12 in isolation from the customer premises wiring 16. The total impedance provides approximately 20 KΩ isolation. Voltage controlled switch 100 enables the transmission of additional signals, such as a caller ID signal, when the communications device 33 is on-hook. For tip/ring DC voltages of greater than 20V, zener diodes D5 and D6 will conduct, allowing a voltage of approximately 1V to be developed across each resistor R5, R6, R7 and R8. This voltage is approximately the lower gate threshold voltage of field effect transistors U1–U4. Tip lead 16a and ring lead 16b are each connected to an N-channel (U2 and U3) and a P-channel (U1 and U4) field effect transistor in parallel. This arrangement allows either the N-channel or P-channel device to be enhanced regardless of the tip/ring polarity. As the tip to ring voltage is increased, as occurs during a ring or surge, the transistor gate to source breakdown is protected by zener diodes D7–D10. Specifically, D7 and D8 protect transistors U1 and U2, and D9 and D10 protect transistors U3 and U4. This arrangement is possible because when all communications devices 33 are on-hook, the central office (CO) or RT (remote terminal) supervision voltage is >20V (typically 48V). Additional signals, such as caller ID, are only transmitted during the time period between the first and second ring, while all communications devices 33 are on-hook. Although this arrangement bypasses the current switching mechanism (made up of components D1–D4, C1, C2, R1 and R2), POTS operation is unaffected because POTS voice transmission is not occurring while all communications devices 33 are on-hook.

When a POTS communications device 33 transitions to an off-hook state from the on-hook state, a DC current in the range of between about 20 mA to about 100 mA is drawn from the customer premises wiring 16 through either the diodes D1, D4 or the diodes D3, D2, depending upon the polarity of tip and ring lines 16a, 16b. The parallel opposing diode pairs D1, D2 and D3, D4 ensure that a forward bias condition will exist on the diode pairs, regardless of the polarity of the tip and ring lines 16a, 16b (tip and ring reversal). The forward biased diodes, for example D2 and D4 when the tip line 16a is positive with respect to the ring line 16b, present a very low AC impedance (approximately, 2Ω) to the voice signal. The total forward DC voltage drop (1.4 volts DC at 20 mA) minimally impacts telephone performance. Further, the capacitors C1, C2 are designed to shunt high frequencies (such as DSL frequencies) around the diodes in order to minimize distortion. The DSL frequencies therefore experience the linear high impedance of the POTS filter 12 at tip and ring lines 21a, 21b.

As further shown in FIG. 1, the POTS filter 12 is cascaded with the automatic control mechanism 14 via tip and ring connections 21a, 21b. The POTS filter 12 provides tip and ring connection 23a, 23b for connection to a POTS communications device, for example, a telephone, speaker phone, analog modem, facsimile machine, cordless telephone, etc. The POTS filter 12 can be implemented with any suitable circuitry, passive or active, for decoupling a POTS communications channel from the combined signal on the tip and ring connections 16a, 16b having the plurality of channels. The preferred embodiment of the POTS filter 12 utilizes a new specific implementation having improved sidetone, which design will be further described in detail later in this document in connection with FIG. 6.

Note that the POTS filter 12 of FIG. 1 is a one-to-one port device, unlike conventional POTS splitters, which are typically one-to-two port devices with one port receiving the combined signal and the other two each outputting a respective channel. However, the functionality of the POTS filter 12 and the POTS splitter are similar in that they both parse out a POTS channel from a communications connection having more than one communications channel. Accordingly, the POTS filter 12 of FIG. 1 can be implemented with a POTS splitter, if desired, by using only two of its ports. Many designs of POTS splitters are known in the art.

Figure 2:
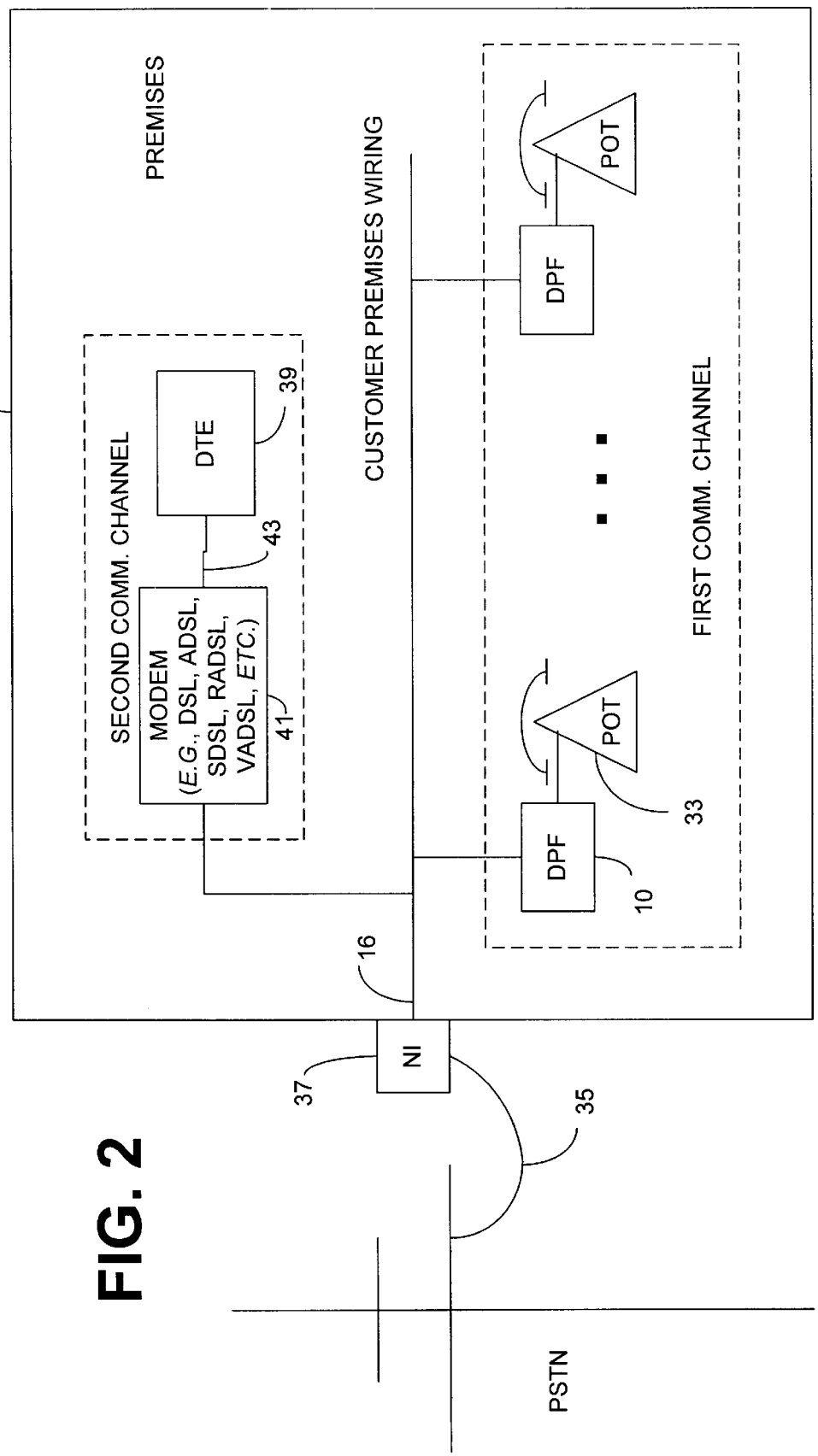
FIG. 2 is a physical view of a DPF system utilizing a plurality of the DPF of FIG. 1.

A DPF system 28 that utilizes a plurality n of DPFs 10 (FIG. 1) is shown in FIG. 2. Referring to FIG. 2, a customer premises 31 is shown with a plurality of telephones 33 having a DPF 10 connected in the series with each telephone 33, between the customer premises wiring 16 and each telephone 33. Any number of telephones 33 can be supported, up to the ringer equivalence number (REN) limit.

The customer premises wiring 16 can be connected to a telephone line 35 by way of a network interface (NI) 37. The network interface 37 is well known in the art.

Data terminal equipment (DTE) 39 can be interfaced with the customer premises wiring 16 by way of any suitable communications device 41, for instance, a data channel modem, in order to permit communications over a second communications channel. This second communications channel can exist concurrently with the first communications channel (POTS channel) on the telephone connection 35 without any appreciable interference to each, in accordance with the invention. A local connection 43 interconnects the DTE 39 with the communications device 41. In the preferred embodiment, the communications device 41 is a conventional asymmetric digital subscriber line (ADSL) modem.

Figure 3:
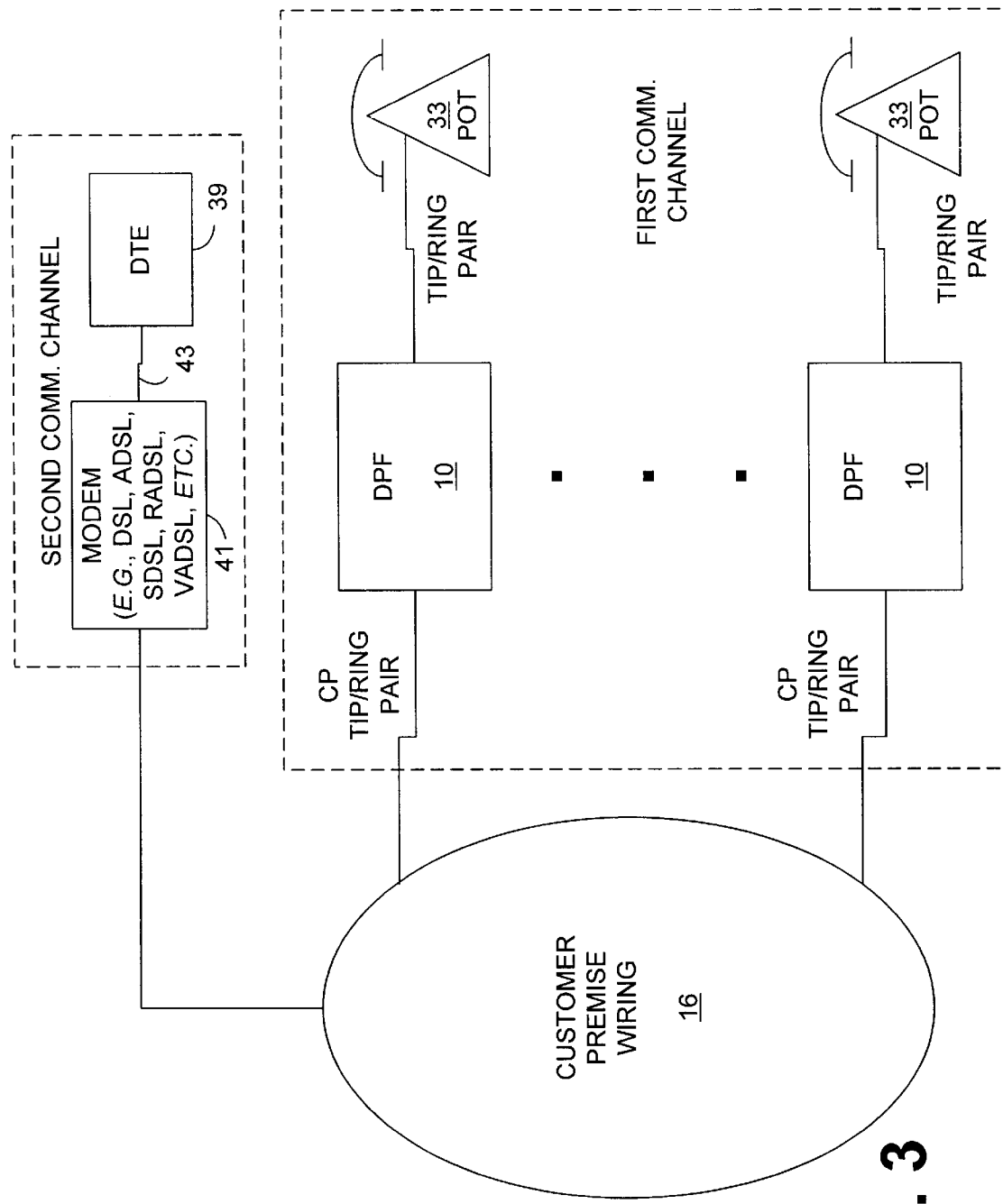
FIG. 3 is an abstract view of the DPF system of FIG. 2.

FIG. 3 is an abstract view of the DPF system 28 (FIG. 2) showing that the system 28 can be viewed as a plurality of parallel distributed POTS filter elements, each of which are situated between the customer premises wiring 16 and a respective telephone 33. As shown, these distributed POTS filter elements are in parallel with the second channel communications device 41, and the DTE 39, relative to the customer premises wiring 16.

Figure 4:
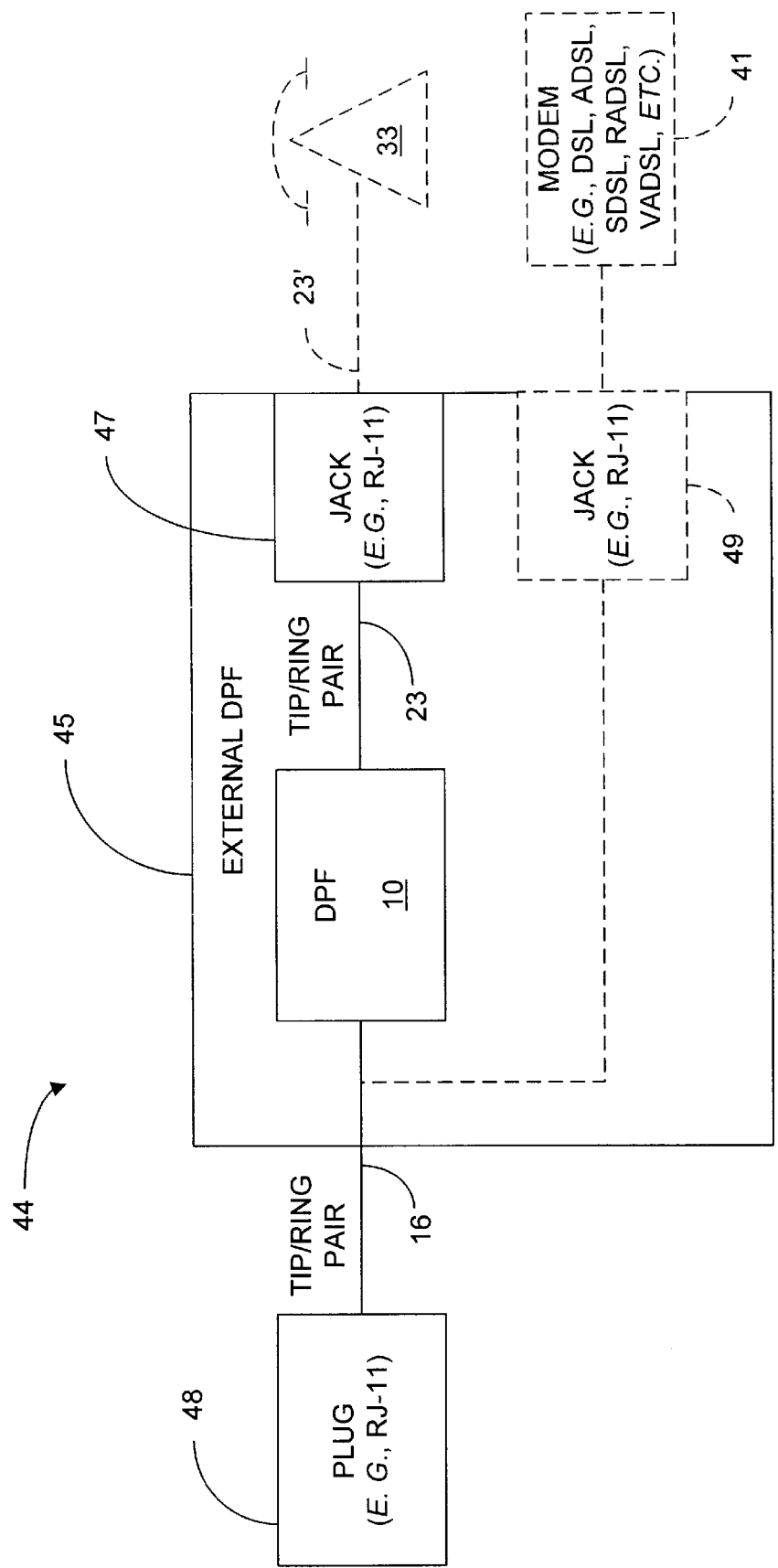
FIG. 4 is a physical view of an external DPF that is disposed external to a telephone.

The DPF 10 can be implemented in a simple user friendly configuration that is external to a telephone 33, as shown in FIG. 4. Referring to FIG. 4, in this embodiment, the DPF 10 is preferably situated within a suitable housing 45 having two ports: a jack 47 (e.g., RJ-11) and a plug 48 (e.g., RJ-11). The DPF 10 is electrically connected between the jack 47 and plug 48 so that the automatic control mechanism 14 is directly connected to the plug 48, and POTS filter 10 is directly connected to the jack 47. Furthermore, for installation and operation, a telephone 33 or other POTS device is connected to the jack 47, and the plug 48 of the DPF apparatus 44 is connected to the customer premises wiring 16 via a mating jack (e.g., a wall outlet RJ-11 jack) associated with the customer premises wiring 16.

Optionally, as indicated by phantom lines in FIG. 4, the housing 45 may also include a jack 49 for connection to a second channel communications device, for example, an ADSL modem 41. In this embodiment, the jack 49 is connected to tip and ring lines 16 and the plug 48, as shown.

Figure 5:
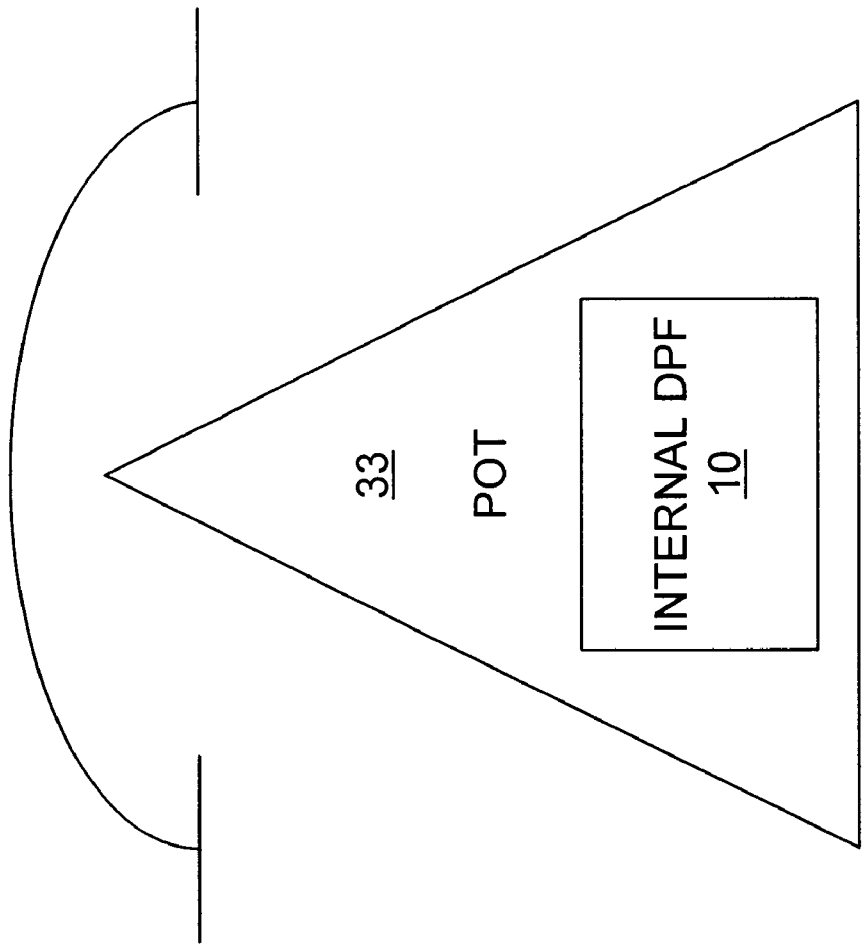
FIG. 5 is a physical view of an internal DPF that is disposed internal to a telephone.

The DPF 10 can also be implemented internally within a telephone 33, as illustrated in FIG. 5, between the telephone connection and the telephone circuitry (not shown for simplicity). This implementation results in several advantages: reduced cost due to one less housing, resulting in a reduced DSL deployment cost; reduced overall size; improved logistics in that there is no DPF 10 dangling on a telephone cord or the necessity to hide or replace the DPF 10; and a new product line for telephone manufacturers.

Furthermore, DPF 10 can be implemented internally in the customer premises. DPF 10 can be installed in the customer premises behind the telephone wall plate, or furthermore, DPF 10 can be integral with the telephone wall plate.

Figure 6:
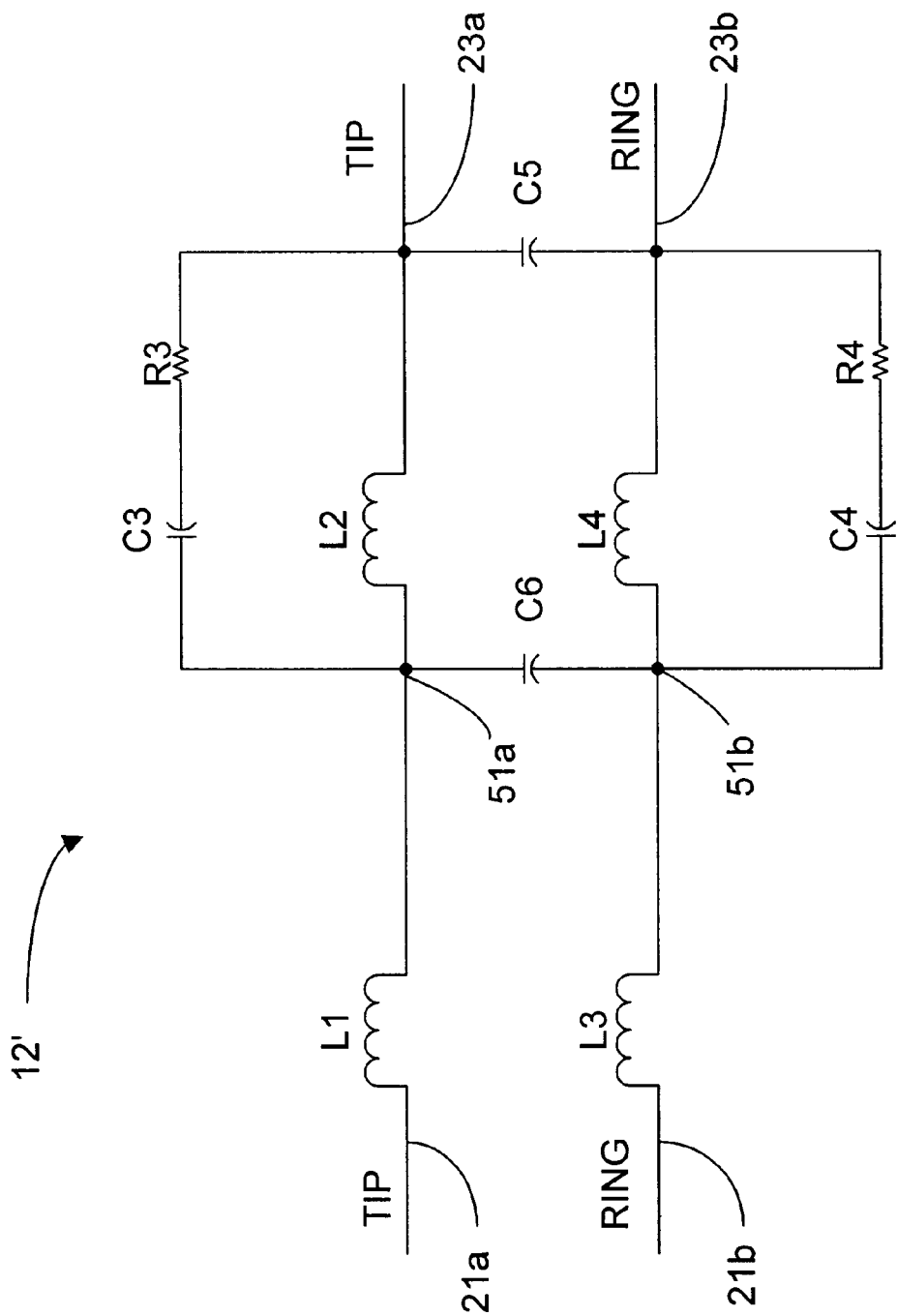
FIG. 6 is a circuit diagram of a possible implementation of a POTS filter of FIG. 1, which provides improved sidetone.

A possible implementation of the POTS filter 12 is shown in FIG. 6 and generally denoted by reference numeral 12'. The POTS filter 12' of FIG. 6 is preferred in that it has demonstrated excellent sidetone performance. Many conventional POTS filters demonstrate very poor sidetone performance. In general, the improved POTS filter 12' of FIG. 6 utilizes a tuning technique (tuning circuits C3, R3 and C4, R4) to improve sidetone, but is still a passive POTS filter device. The tuned frequency and quality factor Q are optimized to improve sidetone in the region most required, in this case, are optimized in the range between about 1 KHz and about 3 KHz.

More specifically, as shown in FIG. 6, the improved POTS filter 12' is a one-to-one port device. In general, it is implemented by modifying a balanced 5th-order 0.01 dB-ripple Chebyshev filter (note that the $5^{th}$ reactance component is based upon a 27 to 33 nF capacitance associated with the second channel communications device and which appears between connections 21a, 21b) with tuning circuit components, comprised of a capacitor (C3, C4) in series with a de-Q resistor (R3, R4, respectively) on each balanced side. In architecture, referring to FIG. 6, the improved POTS filter 12' includes, on the tip side, an inductor L1 connected to the tip line 21a from the automatic control mechanism 14 (FIG. 1). A series combination of a capacitor C3 and a resistor R3 is connected between the node 51a and a node 23a. Also, between the nodes 51a and 23a is an inductor L2. In the preferred embodiment, inductor L1, inductor L2, resistor R3, and capacitor C3 have the following circuit values: 8 mH, 8 mH, 100Ω, and 1 μF, respectively.

On the ring side of the circuit, an inductor L3 is connected to the ring line 21b. An inductor L4 is situated between the nodes 51b and 23b. Also, between these nodes 51b and 23b is situated a series combination of a capacitor C4 and a resistor R4. In the preferred embodiment, inductor L3, L4, resistor R4, and capacitor C4 have the following circuit values: 8 mH, 8 mH, 100Ω, and 1 μF, respectively.

The inductors L1 and L3, as well as the inductors L2 and L4, may be implemented as mutually coupled inductors. In other words, the inductors L1 and L3 may be implemented with a first transformer, and/or the inductors L2 and L4 may be implemented with a second transformer. Use of these transformers may reduce the cost of the POTS filter 12'.

Several capacitors are connected between the tip and ring sides. In particular, a capacitor C5 is connected between tip and ring lines 23a, 23b. In the preferred embodiment, capacitor C5 is 27 nF. Further, a capacitor C6 is connected between the tip and ring lines 51a, 51b. In the preferred embodiment, the capacitor C6 is 56 nF.

When the improved POTS filter 12' is operational, the inductors L1, L3 provide high impedance to high frequencies, particularly those frequencies in the ADSL band. The capacitors C3, C4 resonate with the inductors L2, L4 in order to parallel resonate at the geometric mean of about 1 KHz and about 3 KHz. This feature improves telephone sidetone performance in the 1 to 3 KHz band by improving impedance (restoring the resistance and capacitive reactance) presented to the telephone 33 as compared to a pure L-C (inductor/capacitor) filter structure in prior art embodiments.

OPERATION

The overall operation of a DPF 10 is now described hereafter. Initially, assume that a respective telephone or other POTS communications device 33 is on-hook. In this case, the direct current (DC) resistance of the telephone 33 is greater than 5 MΩ. In this event, very little current is drawn from the customer premises wiring 16, and the diodes D1–D4 of FIG. 1 are essentially unbiased. With regard to POTS signals, the unbiased diodes present a high impedance to small alternating current (AC) signals (e.g., POTS voice signals), thereby disconnecting (or isolating) the POTS filter 12 (and associated loading) from the customer premises wiring 16. This reduction in loading significantly reduces POTS transmission loss and reduces telephone sidetone degradation. In addition, the resistors R1, R2 shunt the leakage circuit around the diodes D1–D4 in the on-hook state, yet are a high enough impedance to maintain the POTS filter 12 in isolation from the customer premises wiring 16. The total impedance provides approximately 20 KΩ isolation. Voltage controlled switch 100 enables the transmission of additional signals, such as a caller ID signal, when the communications device 33 is on-hook. When tip/ring DC voltage exceeds approximately 20V, zener diodes D5 and D6 will conduct, allowing a voltage of approximately 1V, or greater, to be developed across each resistor R5, R6, R7 and R8. This voltage exceeds the gate threshold voltage of the enhancement mode field effect transistors U1–U4. Tip lead 16a and ring lead 16b are each connected to an N-channel (U2 and U3) and a P-channel (U1 and U4) field effect transistor in parallel. This arrangement allows either the N-channel or P-channel device to be enhanced regardless of the tip/ring polarity. As the tip to ring voltage is increased, as occurs during a ring or surge, the transistor gate to source breakdown is protected by zener diodes D7–D10. Specifically, D7 and D8 protect transistors U1 and U2, and D9 and D10 protect transistors U3 and U4. This arrangement is possible because when all communications devices 33 are on-hook, the central office (CO) or RT (remote terminal) supervision voltage is greater than 20V (typically 48V). Additional signals, such as caller ID, are transmitted during the time period between the first and second ring, while all communications devices 33 are on-hook. Although this arrangement bypasses the current switching mechanism (comprising components D1–D4, C1, C2, R1 and R2), POTS operation is unaffected because POTS voice transmission is not occurring while all communications devices 33 are on-hook.

When the POTS communications device 33 transitions to an off-hook state from the on-hook state, a DC current in the range of between about 20 mA to about 100 mA is drawn from the customer premises wiring 16 through diodes D2 and D4. The parallel opposing diodes D1, D3, respectively, ensure that a forward biased condition will exist on one of the two diodes D1, D2 in the tip circuitry and one of the two diodes D3, D4 of the ring circuitry, regardless of the polarity of the tip and ring lines 16a, 16b (tip and ring reversal). The forward biased diodes present a very low AC impedance (approximately, 2 Ω each diode) to the voice signal. The total forward DC voltage drop (1.4 volts DC at 20 mA) minimally impacts telephone performance.

The capacitors C1, C2 shunt high frequencies (such as DSL frequencies) around the diodes in order to minimize distortion. Furthermore, the first inductor stage of the POTS filter 12 provides high impedance to high frequencies (e.g., ADSL frequencies).

Accordingly, the DPF 10, and more specifically, the voltage controlled switch 100, acts as an automatic switch in that it shunts diodes D1 through D4 when all customer premises telephones 33 are on-hook and removes the shunt when a telephone is off-hook. This action is totally transparent to the user, as all telephone functions work as usual (ringing, pulse, and tone dialing, voice communication, etc.). This action allows on-hook caller ID signals to pass through DPF 10, while maintaining normal DPF operation.

Many variations and modifications may be made to the preferred embodiment of the invention without departing substantially from the spirit and principles of the invention. For example, although not an optimal configuration, the automatic control mechanism 14 may be implemented with an unbalanced circuit or with an electrically equivalent, or approximate, set of circuit components. As another example, again, although not an optimal configuration, the POTS filter 12' may be implemented with an unbalanced circuit (essentially with either L1, L2, C3, C5, C6, R3 or L3, M4, C4, C5, C6, R4) or with an electrically equivalent set of circuit components.

As another example, POTS filter 12' may be implemented by any active or passive low-pass filter network, including common state of the art passive LC low-pass filter networks. All such modifications and variations are intended to be included herein within the scope of the present invention, as is defined by the following claims.

What is claimed is:

1. A passive distributed filter for enabling decoupling of first and second simultaneous communications channels on a telephone connection, while enabling the passage of additional signals comprising:

a first channel filter configured to decouple a first channel from a combined signal having said first channel and a second channel on said telephone connection;

an automatic control mechanism configured to isolate said first channel filter from said telephone connection when a first channel device connected thereto is on-hook and configured to interface said first channel filter with said telephone connection when said first channel device is off-hook; and a voltage controlled switch configured to allow the passage of an additional signal during the times when said first channel device is on-hook.

2. The filter as defined in claim 1, wherein said first channel filter is a POTS filter and said first channel is a POTS channel.

3. The filter as defined in claim 1, wherein said first and second channels utilize different frequency ranges.

4. The filter as defined in claim 1, wherein said voltage controlled switch further comprises:

a first diode circuit in series with a resistive circuit;

a plurality of field effect transistors arranged in parallel and configured to receive a voltage signal from said resistive circuit; and a second diode circuit configured to protect said plurality of field effect transistors.

5. The filter as defined in claim 4, wherein said passive distributed filter is implemented within a telephone wall plate.

6. The filter as defined in claim 4, wherein said first diode circuit and said plurality of field effect transistors cooperate to deliver said additional signal to said first channel device regardless of the signal polarity imparted to said first diode circuit.

7. The filter as defined in claim 1, wherein said additional signal is a caller ID signal.

8. A telephone for connecting to a telephone connection having a POTS channel combined with a second communications channel, comprising:

a POTS filter configured to decouple said POTS channel from a combined signal having said POTS channel and said second communications channel on said telephone connection;

an automatic control mechanism configured to isolate said POTS filter from said telephone connection when said telephone is on-hook and configured to interface said POTS filter with said telephone connection when said telephone is off-hook; and a voltage controlled switch configured to allow the passage of an additional signal during the times when said telephone is on-hook.

9. A distributed filter apparatus for connecting a POTS communication device to a telephone connection having a POTS channel and a second communications channel and for decoupling the POTS channel, while enabling the passage of additional signals comprising:

a housing with first and second ports, said first port adapted for connection to said telephone connection and said second port adapted for connection to said POTS communication device;

a POTS filter within said housing and connected to said second port, said POTS filter configured to decouple said POTS channel from a combined signal having said POTS channel and said second communications channel on said telephone connection;

an automatic control mechanism within said housing and connecting said POTS filter and said first port, said automatic control mechanism configured to isolate said POTS filter from said telephone connection when said POTS communications device is on-hook and configured to interface said POTS filter with said telephone connection when said POTS communications device is off-hook; and a voltage controlled switch configured to allow the passage of an additional signal during the times when said POTS communications device is on-hook, by bypassing the circuitry that prevents the passage of said additional signal.

10. The apparatus as defined in claim 9, further comprising a third port associated with said housing configured to connect a second communications device adapted to utilize said second communications channel with said telephone connection.

11. The apparatus as defined in claim 10, wherein said distributed filter is implemented within a telephone wall plate.

12. A passive distributed filter system for enabling decoupling of first and second communications channels on a telephone connection, while enabling the passage of additional signals comprising:

a plurality of first communications devices;

a plurality of distributed filters corresponding respectively with and connecting each of said first communications devices to said telephone connection, each said distributed filter comprising an automatic control mechanism and a first channel filter, said automatic control mechanism configured to isolate said first channel filter when a respective first communications device is inactive, said distributed filter configured to interface communications on a first channel on said telephone connection with said respective first communications device when said first communications device is active;

a second communications device connected to said telephone connection and communicating signals over a second channel; and a voltage controlled switch configured to allow the passage of an additional signal during the times when each of said plurality of first communications devices is on-hook, by bypassing the circuitry that prevents the passage of said additional signal.

13. The system as defined in claim 12, wherein said first channel filter is a POTS filter and said first channel is a POTS channel.

14. The system as defined in claim 12, wherein said first and second channels utilize different frequency ranges.

15. The system as defined in claim 12, wherein said voltage controlled switch further comprises:

a first diode circuit in series with a resistive circuit;

a plurality of field effect transistors arranged in parallel and configured to receive a voltage signal from said resistive circuit; and a second diode circuit configured to protect said plurality of field effect transistors.

16. The filter as defined in claim 15, wherein said passive distributed filter is implemented within a telephone wall plate.

17. The system as defined in claim 12, wherein said additional signal is a caller ID signal.

18. The system as defined in claim 15, wherein said first diode circuit and said plurality of field effect transistors cooperate to deliver said additional signal to said first communications device regardless of the signal polarity imparted to said first diode circuit.

19. A method for implementing a passive distributed filter system for enabling decoupling of first and second communications channels on a telephone connection at a plurality of sites, while enabling the passage of caller ID signals, comprising the steps of:

interfacing a plurality of first channel communications devices with said telephone connection using a distributed filter, said first channel communications devices configured to communicate over said telephone connection via a first channel, said distributed filter comprising an automatic control mechanism and a first channel filter, said automatic control mechanism configured to isolate said first channel filter when a respective first communications device is inactive, said distributed filter configured to interface communications on a first channel on said telephone connection with said respective first communications device when said first communications device is active;

interfacing a second channel communications device to said telephone connection, said second channel communications device configured to communicate over said telephone connection via a second channel;

permitting noninterfering simultaneous communications via said first and second channels over said telephone connection; and permitting the passage of an additional signal during the times when each of said first channel communications devices is on-hook.

20. The method as defined in claim 19, further comprising the step of using POTS filters as said first channel filters and a POTS channel as said first channel.

21. The method as defined in claim 19, further comprising the step of utilizing different nonoverlapping frequency ranges for said first and second channels.

22. The method as defined in claim 19, wherein said step of permitting the passage of an additional signal further comprises the steps of:

using a first diode circuit in series with a resistive circuit;

using a plurality of field effect transistors arranged in parallel and configured to receive a voltage signal from said resistive circuit; and using a second diode circuit configured to protect said plurality of field effect transistors.

23. The method as defined in claim 19, wherein said additional signal is a caller ID signal.

24. The method as defined in claim 22, wherein said first diode circuit and said plurality of field effect transistors cooperate to deliver said additional signal to said first channel communications device regardless of the polarity of the signal imparted to said first diode circuit.

25. A passive distributed filter for enabling decoupling of first and second simultaneous communications channels on a telephone connection, while enabling the passage of additional signals comprising:

a first channel filter configured to decouple a first channel from a combined signal having said first channel and a second channel on said telephone connection;

an automatic control mechanism configured to isolate said first channel filter from said telephone connection when a first channel device connected thereto is on-hook and configured to interface said first channel filter with said telephone connection when said first channel device is off-hook; and bypass circuitry configured to allow the passage of an additional signal when said first channel device is on-hook.

26. The filter as defined in claim 25, wherein said first channel filter is a POTS filter and said first channel is a POTS channel.

27. The filter as defined in claim 25, wherein said first and second channels utilize different frequency ranges.

28. The filter as defined in claim 25, wherein said bypass circuitry further comprises:

a first diode circuit in series with a resistive circuit;

a plurality of field effect transistors arranged in parallel and configured to receive a voltage signal from said resistive circuit; and a second diode circuit configured to protect said plurality of field effect transistors.

29. The filter as defined in claim 28, wherein said passive distributed filter is implemented within a telephone wall plate.

30. The filter as defined in claim 28, wherein said first diode circuit and said plurality of field effect transistors cooperate to deliver said additional signal to said first channel device regardless of the signal polarity imparted to said first diode circuit.

31. The filter as defined in claim 25, wherein said additional signal is a caller ID signal.

* * * * *

UNITED STATES PATENT AND TRADEMARK OFFICE
CERTIFICATE OF CORRECTION

PATENT NO. : 6,028,919
DATED : February 22, 2000
INVENTOR(S) : Thomas J. Bingel and Carlos A. Rios It is certified that error appears in the above-identified patent and that said Letters Patent is hereby corrected as shown below:

In the Abstract, line 8, after "plurality" insert -- of --.
Col. 1, line 10 delete "60-067778" and substitute therefor -- 60/067,778 --.
Col. 1, line 34 delete the second occurrence of "ADSL" and substitute therefor -- DSL --.
Col. 2, line 11 delete "exist" and substitute therefor -- exists --.
Col. 2, line 57 delete "an" and substitute therefor -- a --.
Col. 4, line 19 delete "part" and substitute therefor -- parts --.
Col. 4, line 24 delete "DPF" and substitute therefor -- DPFs --.
Col. 8, line 63 delete "circuit" and substitute therefor -- current --.

Signed and Sealed this

Twenty-seventh Day of February, 2001

Attest:

NICHOLAS P. GODICI

Attesting Officer    Acting Director of the United States Patent and Trademark Office